United States Patent [19]

Crews

[11] 4,230,176
[45] Oct. 28, 1980

[54] FLOATING RADIATOR TANK TOP

[75] Inventor: Donald R. Crews, Peoria, Ill.

[73] Assignee: Caterpillar Tractor Co., Peoria, Ill.

[21] Appl. No.: 899,769

[22] Filed: Apr. 24, 1978

[51] Int. Cl.³ .......................... F28F 9/00; F28D 1/00
[52] U.S. Cl. ........................... 165/67; 165/82; 165/149
[58] Field of Search ............ 165/81, 82, 149, 151-153, 165/67; 248/DIG. 1; 180/69 R, 68 P

[56] References Cited

U.S. PATENT DOCUMENTS

| | | | |
|---|---|---|---|
| 1,917,460 | 7/1933 | Purdy | 180/69 R |
| 2,363,526 | 11/1944 | Hobbs | 165/82 X |
| 3,165,151 | 1/1965 | Astrup et al. | 165/81 |
| 3,710,853 | 1/1973 | Young | 165/81 |
| 4,143,844 | 3/1979 | Meter | 248/DIG. 1 |

FOREIGN PATENT DOCUMENTS

| | | | |
|---|---|---|---|
| 877353 | 9/1961 | United Kingdom | 165/82 |
| 923703 | 4/1963 | United Kingdom | 165/149 |

*Primary Examiner*—Sheldon Richter
*Assistant Examiner*—Margaret A. Focarino
*Attorney, Agent, or Firm*—Wegner, Stellman, McCord, Dalton & Wood

[57] ABSTRACT

A unit core radiator is provided with support for the top tank and bottom tank so as to prevent the top and bottom tanks from vibrating relative to the support and at the same time to permit expansion and contraction of the core relative to the support. Mating members are carried by the top tank and the side channels and are urged against each other to form slip joints to allow limited movement between the tank top and the side channels in adjusting for temperature changes in the cooling fluid.

8 Claims, 5 Drawing Figures

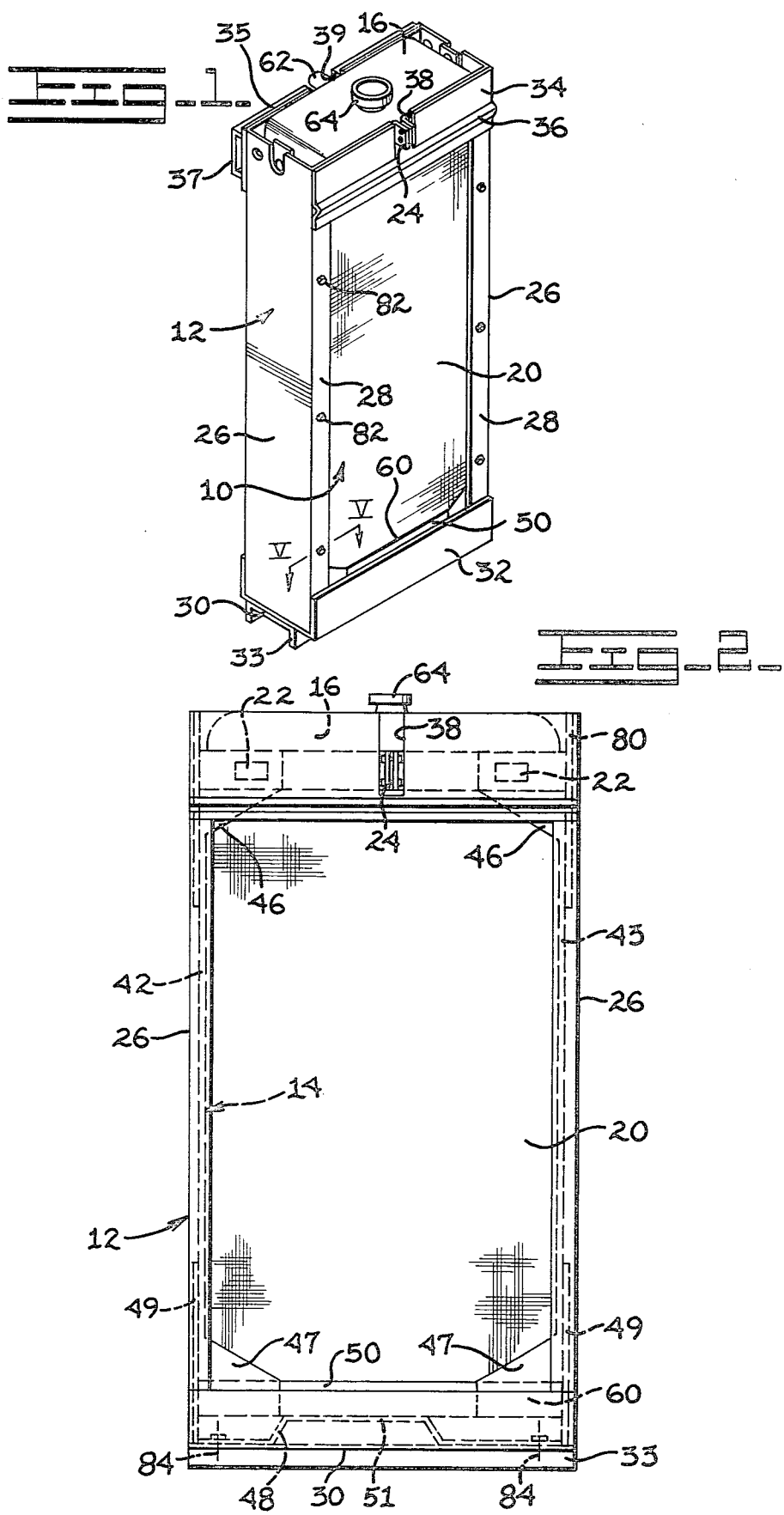

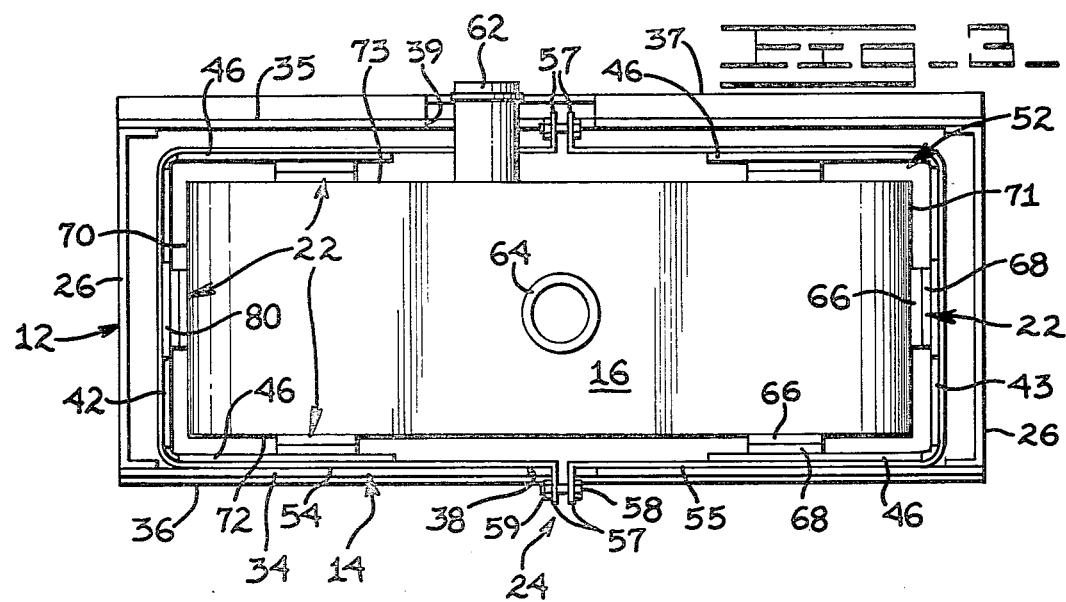
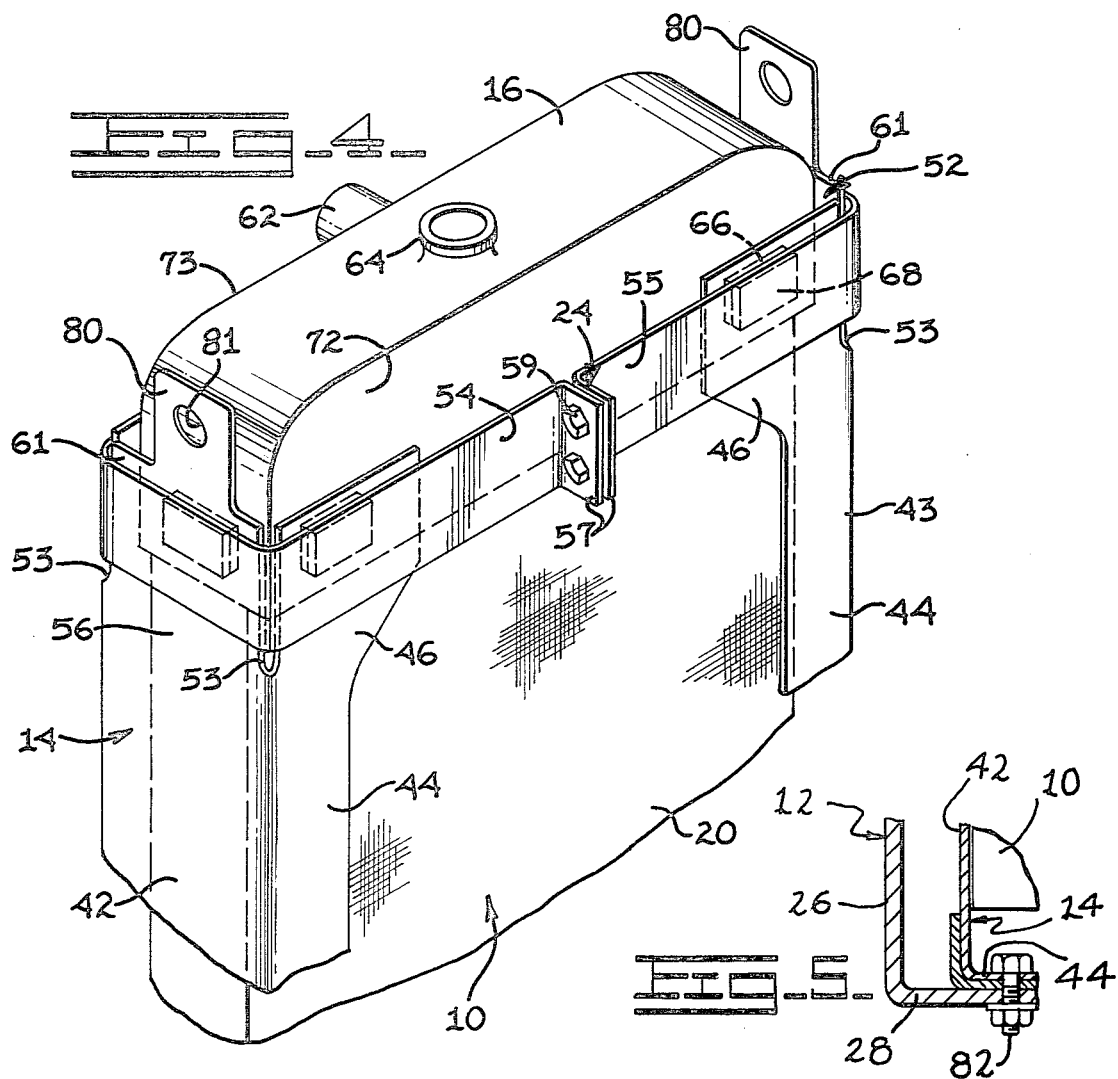

4,230,176

FLOATING RADIATOR TANK TOP

BACKGROUND OF THE INVENTION

1. Field of the Invention

This invention relates to heat exchangers and, more particularly, to a floating unit radiator tank top.

2. Description of the Prior Art

Heretofore, in radiator-type heat exchangers having a bottom tank, a top tank or header with a core communicating between the two, the header or top tank is rigidly connected to the frame supporting the radiator on the internal combustion engine or the like. As the temperature of the fluid passing through the radiator increases, the core expands, forcing the header or top tank upward with respect to the bottom tank. The expansion force bends the header, straining the core-to-header solder joint. When the strain exceeds the shear strength of the solder, the joint fails and the radiator leaks. This can result in loss of coolant for the engine which, if not discovered in time, can result in overheating the engine and even possible failure thereof.

SUMMARY OF THE INVENTION

The present invention is directed to overcoming one or more of the problems as set forth above.

According to the present invention, a unit core radiator is provided with a bottom tank, a top tank, and a core extending between the bottom tank and the top tank. A support for the radiator comprises a cradle and a pair of side channels attached to said cradle with the side channels extending in overlapping relationship to the top tank. A slip joint is carried by the top tank and by the overlapping portions of the side channels. A clamp is carried by the side channels for increasing the pressure in the slip joint whereby the slip joint permits expansion and contraction of the core so that the top tank may move further away from or closer to the bottom tank.

BRIEF DESCRIPTION OF THE DRAWING

The details of construction and operation of the invention are more fully described with reference to the accompanying drawing which forms a part hereof and in which like reference numerals refer to like parts throughout.

In the drawing:

FIG. 1 is a perspective view of a heat exchanger or radiator in a picture frame mounting with the improved slip joint between the top tank and the side channels;

FIG. 2 is an elevational view of the heat exchanger of FIG. 1 showing the top and bottom tanks and elements of the invention in dashed lines;

FIG. 3 is a top plan view of the radiator of FIGS. 1 and 2;

FIG. 4 is a perspective view of the top portion of the radiator and support removed from the picture frame mounting and showing the elements of the invention; and FIG. 5 is a partial cross-sectional view taken along the line 5—5 of FIG. 1.

DESCRIPTION OF THE PREFERRED EMBODIMENT

Referring generally to FIGS. 1 and 2, a unit core radiator 10 is mounted on a picture frame member 12 ready for attachment in the engine compartment of a vehicle, or the like (not shown). Within the picture frame member 12 is mounted a radiator support 14, shown in FIG. 4 removed from the frame member 12, in which is nested the core radiator 10. The radiator 10 has a top tank 16 in contact with the radiator support 14 through slip joints 22, as is best shown in FIGS. 3 and 4. The slip joints 22 are loaded by a clamping arrangement 24. The loading of the slip joints 22 prevents the radiator from vibrating relative to the frame member 12 while permitting the radiator to expand upwardly without bending the tank or overstressing the connections between the top tank 16 and the core 20 of the radiator.

More specifically referring to FIGS. 1–3, the picture frame member 12 is comprised of a pair of upright side walls 26 having inwardly extending parts 28, which parts 28 are secured in overlapping relationship to the upwardly extending parts 32 of a bottom wall 30. An inverted channel member 33 is secured to bottom wall 30 for use in assembling the frame 12 to a vehicle or the like. A cross member 34 is joined to and extends between the upper portions of the parts 28 of the side walls 26 and has a stiffening rib 36 running the length thereof between said side walls 26. A notch or cutout 38 is formed in the upper portion of member 34 and extends down to but not through the stiffening rib 36. A second cross member 35 is spaced from member 34 and extends between the parts 28 of the walls 26. A channel member 37 is secured to cross member 35 to add stiffness to member 35 and to provide a mounting for attaching the frame member 12 to the vehicle or the like. The member 35 and channel 37 have a cutout 39 extending partway down from the top edge thereof.

The radiator support 14, as shown in FIGS. 3 and 4, is comprised of a pair of side channels 42, 43 having inwardly facing flanges 44 which flanges have extensions 46 at the upper portions and at the top and extensions 47 at the lower portions thereof. The channels 42, 43 are joined at the bottom, see FIG. 2, by a cradle 48 which has upstanding parallel ends 49, upstanding sides 50 and a raised platform 51 spaced inward from said ends 49. The ends 49 are secured to the channels 42, 43 and the sides 50 are secured to the enlarged extensions 47 of the flanges 44 of the channels 42, 43 to form a pocket 52 within the confines of the channels 42, 43 and the cradle 48. The side channels 42, 43 have cutaway corners 53 in the upper portions thereof so as to permit independent movement of the upper portions 61 of the bases 56 of the channels 42, 43 and the extensions 46 at the upper portions of the flanges 44. The clamping arrangement 24 is comprised of a pair of U-shaped straps 54, 55 which are secured, respectively, to the upper independently movable portions 61 of the bases 56 of the channels 42 and 43 with the ends 57 of the U-shaped straps 54, 55 turned outwardly at substantially right angles to the arms of said U-shaped straps. The ends 57 of the respective straps 54, 55 are spaced apart and have a pair of threaded members, such as bolts 58, passing therethrough with nuts 59 threaded on the ends thereof such that tightening the nuts 59 on the bolts 58 will draw the U-shaped straps 54, 55 together to shorten the distance between the independently movable portions 61 of the bases 56 of the channels 42, 43 and to urge the extensions 46 on each channel 42 and 43 toward each other.

The core radiator 10 is comprised of a bottom tank 60, see FIGS. 1 and 2, the intermediate core 20, and the top tank 16, all being substantially a conventional construction. The top tank 16, as shown in FIGS. 1, 3 and 4, has an outlet nipple 62 extending rearward from one side thereof and has a filler spout 64 extending upwardly therefrom. The radiator 10 nests in the pocket 52 of the radiator support 14 with the bottom tank 60 resting on the raised platform 51 in the cradle 48. The flanges 44 of the side channels 42, 43 embrace the edges of the core 20 with extensions 47 and cradle 48 embracing the bottom tank 60, and the extensions 46, upper portions 61 of base 56 and the clamping arrangement 24 embracing the top tank 16.

Plural slip joints 22 are provided between the top tank 16 and the extensions 46 and the upper portions 61 of the side channels 42, 43. The slip joints 22 are comprised of pads 66 carried by the top tank 16 and plates 68 carried by the extensions 46 and the upper portions 61 of the side channels 42, 43. Pads 66, shown rectangular in shape although they may be any desired shape, are made of brass or like material having a surface with a relatively low coefficient of friction and are secured, as by soldering or the like, to the ends 70, 71 and to the front and rear sides 72, 73 of the top tank 16. The upper portions 61 of the bases 56 and the extensions 46 of the flanges 44 of the channels 42, 43 have plates 68 secured thereto in alignment with the pads 66. The plates 68 may be made of steel, spot welded to the channels, and may have an antifriction coating, such as poly(tetrafluoroethylene), on the surface thereof in contact with the pads 66.

The clamping arrangement 24 is tightened by bolts 58 and nuts 59 to apply a load to the slip joints 22. The load is of such an amount as to prevent the radiator 10 from moving or vibrating relative to the support 14, but said load can be overcome by expansion forces in the radiator. That is, heated fluid flowing through the radiator will expand the core 20, but since the bottom tank 60 is supported in the cradle 48 of the support 14, the expansion will move the top tank 16 relative to said bottom tank 60. The expansion force will overcome the load or frictional resistance in the slip joints 22 and allow the pads 66 and top tank 16 not only to move relative to the plates 68 on the side channels 42, 43, but also to move relative to the bottom tank 60. The breakaway force needed to overcome the frictional resistance in the loaded slip joints 22 so as to move the pads 66 relative to the plates 68 is less than the bending force of the tank and less than the shear strength of the connection between the core 20 and the top tank 16 so that bending of the tank and/or rupture or failure of the connection between the tank 16 and the core 20 is avoided.

The slip joints 22 between the top tank 16 and the support 14 permit expansion of the core 20 of the radiator 10 without failure of the connections between the top tank 16 and the core 20 caused heretofore by the rigid mounting of the top tank to the support.

Tabs 80 are formed on the ends of the extensions 61 of the bases 56 of the side channels 42, 43 such that a lifting hook (not shown), or the like, may be inserted in the openings 81 in the tabs 80, whereupon the radiator 10 and support 14 can be lifted for insertion into or removal from the picture frame member 12 and/or the engine compartment of a vehicle.

The picture frame member 12 receives the support 14 and radiator 10 by insertion from the open top of said member 12. The ends 57 of the clamp arrangement 24 nest in the cutouts 38 and 39 in the cross members 34, 35, respectively, with the outlet nipple 62 also nesting in the cutout 39. As shown in FIG. 5, the support 14 is secured to picture frame member 12 by bolts 82 which pass through the parts 28 of frame member 12 and flanges 44 of said support 14. As shown in FIG. 3, the cradle 48 of support 14 is bolted at 84 to the bottom wall 30 of the member 12. The picture frame member 12 is secured to the vehicle frame preparatory to connecting the radiator 10 to the engine of the vehicle.

The embodiment of the invention in which an exclusive property or privilege is claimed is defined as follows:

1. A unit core radiator having a bottom tank, a top tank, and a heat exchange core extending between said bottom tank and said top tank, a support on which said bottom tank is carried, side channel supports attached to said support and extending upwardly adjacent said heat exchange core and projecting in overlapping relationship to said top tank, low friction means carried by said top tank in contact with said overlapping side support for supporting said top tank relative to said side channel supports, means encircling said side channel supports and said top tank and means on said encircling means for tightening said encircling means to urge said side supports into frictional engagement with said low friction means on said top tank whereby passing heated fluid through said radiator expands said heat exchange core to force the top tank and the low friction means on the top tank to move longitudinally relative to the side support.

2. In a unit core radiator as claimed in claim 1 wherein said low friction means carried by said top tank comprises a plurality of pads around the periphery thereof, and said side channel supports have a mating number of plates aligned with and in contact with said pads whereby said means for tightening said encircling means urges said plates into frictional contact with said pads to yieldably restrain movement of said top tank relative to said bottom tank.

3. In a unit core radiator as claimed in claim 1 wherein said low friction means carried by said top tank has a surface with a low coefficient of friction, and wherein said side support has plates aligned with said low friction means, said plates are coated on the contact surface with an antifriction material.

4. In a unit core radiator as claimed in claim 1 wherein said side channel supports embrace the edges of said core and wherein said encircling means is a strap and said means for tightening said strap is a threaded member connecting the ends of said strap.

5. In a unit core radiator having a bottom tank, a top tank, and a core extending between said bottom tank and said top tank, a support having a cradle and a pair of side channels attached to said cradle and extending in overlapping relationship to said top tank, in which the improvement comprises a slip joint means carried by said top tank and by said side channels, and means carried by said side channels for increasing the pressure in said slip joint means, whereby said slip joint means permits expansion and contraction of said core to move said top tank further away from or closer to said bottom tank.

6. In a unit core radiator as claimed in claim 5 wherein said slip joint means comprises a plurality of pads mounted around the periphery of the top tank and a like plurality of plates mounted on the inside of said overlapping portions of the side channels, each plate being aligned with one pad and in contact with said pad whereby said means for increasing the pressure in the slip joint means urges said plates into friction contact with said pads to yieldably restrain movement of said top tank relative to said bottom tank.

7. In a unit core radiator as claimed in claim 6 wherein said pads have a surface with a low coefficient of friction and wherein said plates are coated with an antifriction material.

8. In a unit core radiator as claimed in claim 5 wherein said side channel supports embrace the edges of said core and wherein said means for increasing the pressure is a strap which has a threaded member connecting the ends of said strap.

* * * * *